Sept. 16, 1924.　　　　　　　　　　　　　　　　　1,508,564
F. MATHEWS
GEARING
Filed March 15, 1924　　　3 Sheets-Sheet 1

Witness:
Chas. R. Kunst

Inventor:
Fred Mathews
By Thomason, Ranshouse & Lindy, Attys.

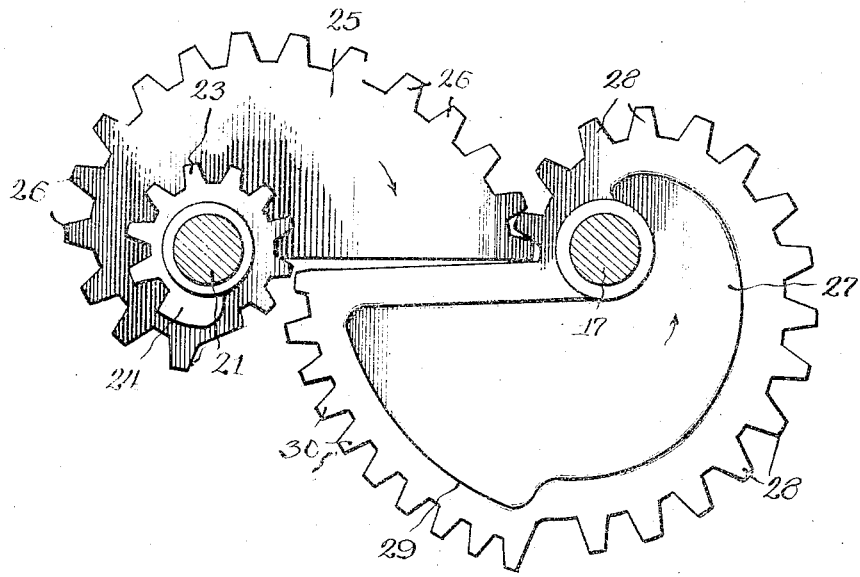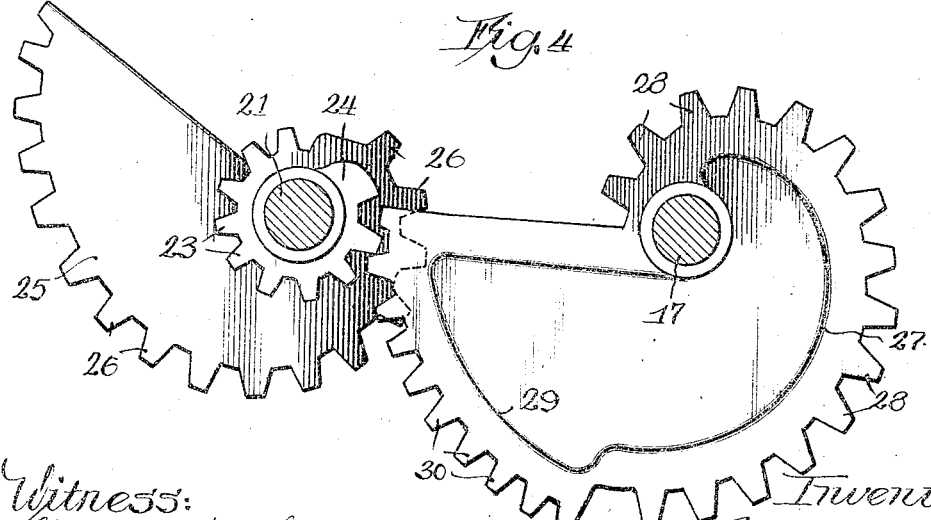

Sept. 16, 1924. 1,508,564
F. MATHEWS
GEARING
Filed March 15, 1924 3 Sheets-Sheet 3

Patented Sept. 16, 1924.

1,508,564

UNITED STATES PATENT OFFICE.

FRED MATHEWS, OF CHICAGO, ILLINOIS.

GEARING.

Application filed March 15, 1924. Serial No. 699,010.

*To all whom it may concern:*

Be it known that I, FRED MATHEWS, a citizen of the United States, and resident of Chicago, in the county of Cook and State of Illinois, have invented certain new and useful Improvements in Gearing, of which the following is a full, clear, and exact description, such as will enable others skilled in the art to make and use the same.

My invention relates to gearing and more particularly to a mechanism in which the ratio between the gears is gradually changed, owing to the peculiar formation of the structure, so that the driven gear may be initially rotated at a fast speed that is gradually diminished as the gear ratio changes so that increased power is obtained as the speed of the driven gear is reduced.

One of the objects of my invention is to provide a gear mechanism that is adapted for use in connection with the operation of the drawer rod of railroad car hand brakes so that the slack of the chain or cable may be taken up rapidly, and thereafter the ratio changes so that the leverage and power is materially increased during the actual braking operation without altering the speed or power utilized at the hand-wheel. While the structure is herein disclosed for convenience in connection with a brake mechanism, it, of course, may be employed in connection with any structure where the principles thereof may be indicated for the services desired. In carrying out my invention I have made use of several types of gearing and have embodied the same in two gear elements that mesh with each other in such manner that a continued rotation of the power or driving gear will be transmitted to the driven gear by a differential action so that the latter gear will be actuated at several speeds and under a change of leverage or ratio between the toothed faces of the respective elements.

It is also an object of my invention to provide a gearing that is extremely compact in its arrangement, that is dependable in operation, that is simple in construction and will not readily get out of order, and that is dependable in performing the functions for which it has been designed, besides being economical to manufacture so that it may be sold for a moderate price.

I prefer to carry out my invention in substantially the manner hereinafter fully described and as more particularly pointed out in the claims, reference being had to the accompanying drawings that form a part of this specification, in which, Figure 1 is a top plan of my gear mechanism in assembled form and mounted in a suitable retainer for use in connection with the hand operated brake mechanism of a railway car.

Figure 3 is a top plan of the gearing illustrated in Figure 1 and with the retainer and other parts removed to disclose the relative position of the gear elements when the initial movement begins.

Figure 4 is a view of the elements shown in Figure 3, showing their relative positions after the driven gear has been moved for one complete revolution.

Figure 1:
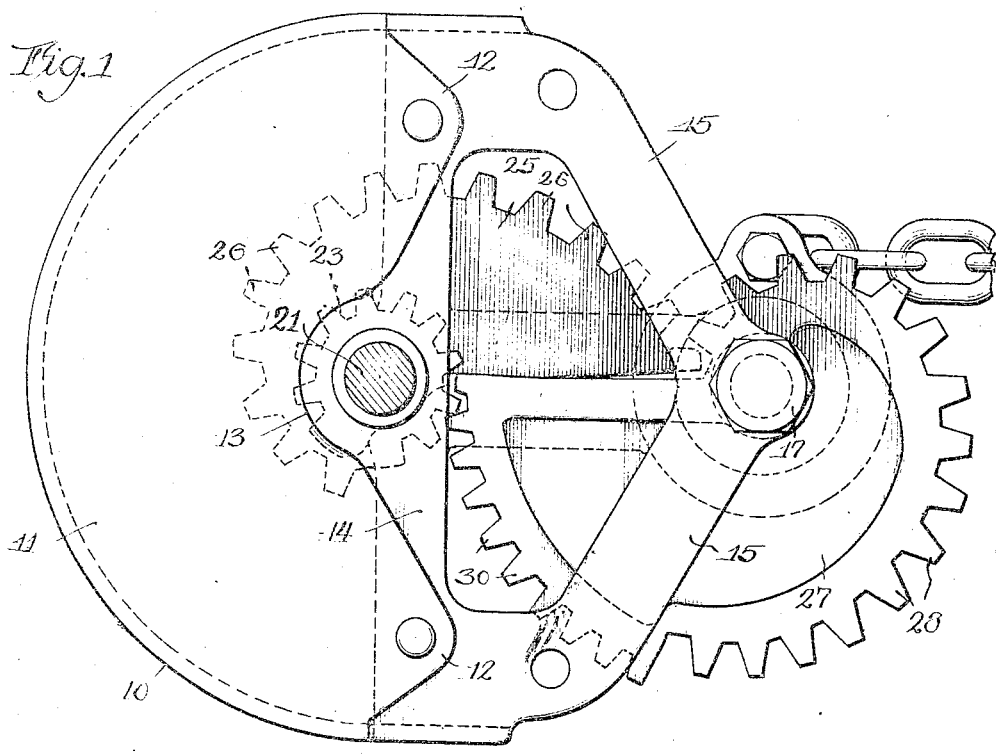
Figure 2:
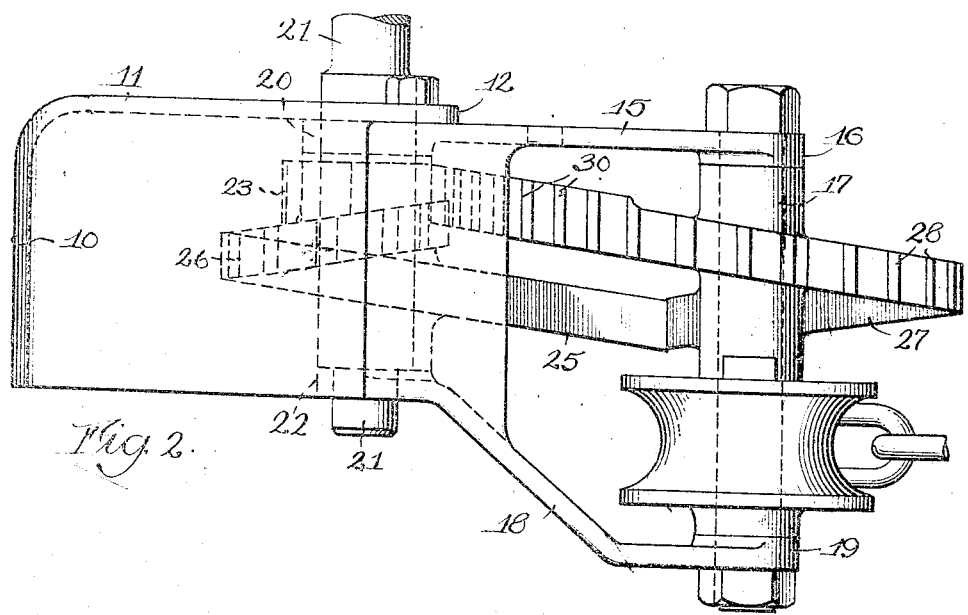
Figure 2 is a vertical side elevation of the structure shown in Figure 1.

The drawings show a typical or preferred embodiment of my invention, and similar reference characters have been employed to designate the same parts wherever they occur throughout the several views. Referring first to Figures 1 and 2 it will be seen I provide a suitable housing consisting of a segmental shaped vertically disposed wall 10, preferably of semi-circular contour, the upper edges of which are connected by a top or cover 11, that has an irregular outer edge that provides screw-lugs 12 and a recessed portion 13. A skeleton or open frame is secured by bolts or the like to the lugs 12 of the structure just described and consists of a transverse member 14 from the opposite ends of which project converging arms 15, which at their point of juncture provide a central bearing 16 for the vertical spindle 17 of the driven gear to the upper end of which the actuating hand-wheel (not shown) is secured in the usual manner. Extending outwardly and downwardly from the lower portion of the skeleton frame is a single arm 18, the lower end of which is deflected horizontally and terminates in a bearing boss 19, for the lower end of the driven spindle 17 and is below and in alinement with the upper bearing boss 16. The transverse member 14 has a downwardly extending boss 20 at about its center of length below the recessed portion 13 of the top plate that provides the upper bearing for the spindle 21 of the drive gear, and a similar boss 22 is provided at the upper end of the arm 18 heretofore mentioned for the lower end of said spindle. The structure heretofore described, while it is desirable when the gearing is used in connection with a hand-brake for railway cars, is not, however, essential to the successful operation of the gearing herein disclosed, and, as any suitable means may be provided for mounting the gearing structure, the same forms no part of my present invention.

The drive gear, as seen in the drawings, preferably consists of a spur-gear 23 that forms what might be termed a hub for said drive gear. The teeth of this spur-gear 23 however may not extend entirely around the same in a concentric manner but may terminate in a block 24 so as to stop the further rotation of the structure. Extending from the spur-gear is an inclined scroll-gear in the form of an eccentric flange 25, having upon its edge a plurality of teeth 26 so that there is provided a spiral gear, that is eccentric to or forms a convolute around the spur-gear with its smallest radius at the spur-gear. Thus it will be seen the driving gear consists of a relatively small spur that merges into an eccentric gear that is disposed spirally and inclined with respect to said spur and the same is mounted upon the driving spindle 21 heretofore mentioned.

The driven element of this gearing comprises a scroll or spiral gear of a modified construction and consists of a flange or spirally inclined plate having a plurality of teeth 28 upon its edge that are adapted to mesh with the teeth 26 of the driving element. The teeth 28, of course, are spirally arranged and extend in an inclined plane so that they will mesh with all of the teeth 26 on the spiral and eccentric portion of the driving member. Part way around its periphery, the flange or inclined plate 27 changes its form from a convolute to a concentric arrangement as at the sector 29, but continues in an inclined plane, and the edge of this concentric portion is provided with teeth 30 arranged concentric with the hub or axis of the driven member so that the latter teeth 30 will mesh with the concentric teeth 23 which form the spur-gear 23.

Figure 5:
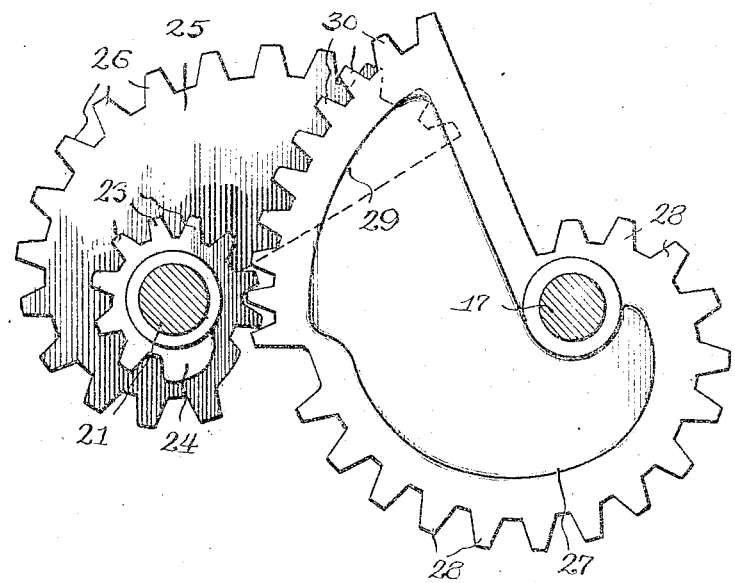
Figure 5 shows the structure illustrated in Figures 3 and 4 at an intermediate position.
Figure 6:
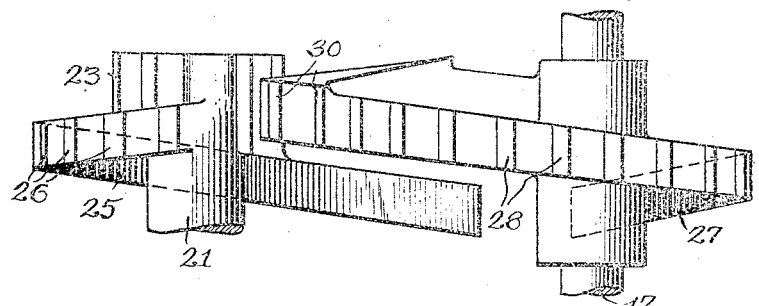
Figure 6 is a side elevation of the gear elements in the position shown in Figure 5.

In its initial position, illustrated in detail in Figures 1, 2 and 3 of the drawings, the teeth 26 of the eccentric flange 25 on the driving member are in mesh with the teeth 28 on the eccentric or scroll portion of the driven member, and when the driven member is rotated in the direction of the arrow (Figure 3), the driven member will be actuated rapidly and, in the case of a brake on a railway car, there is little or no resistance to be overcome and the slack in the chain will be rapidly or quickly taken up. Upon the respective gear members reaching the positions shown in Figures 5 and 6 the slack in the chain or cable will have been entirely taken up and the power will then begin to be applied to the brake itself. It will be seen that the driving member will now be employing the spur-gear teeth 23 in cooperation or in mesh with the teeth 30 on the concentric portion of the driven member so that the leverage is materially increased upon the latter and the small gear is driving a relatively large gear or sector at a slower speed than initially but with increased power. This will continue until the brake has been entirely set, or the spur-gear will have reached its end or block 24, at which point further rotation of the structure is not effective or may be stopped. It will be noted that the flanges, when the concentric portion of the two members are in mesh, will be passing one above the other, and this is rendered possible by the forming of the flanges in an inclined and spiral manner. It will also be seen that a complete rotation of the driven member is obtained by one and a third rotations of the drive member.

It is obvious that divers modifications and refinements of the structure which has been illustrated and described may be made without materially departing from the principles of my invention. I therefore desire it understood that all such changes are fully contemplated as coming within the scope of the appended claims.

What I claim is:—

1. A gearing comprising two unitary gears in engagement with each other, a portion of the teeth on each gear being eccentric and oblique to the axis of rotation and the remaining portion being concentric to the axis of rotation of the respective gears.

2. A gearing comprising a spur gear, a convolute flange the periphery of which merges into said spur gear, a segmental gear adapted to engage said spur gear, and a gear element the periphery of which extends in a convolute from said segmental gear and adapted to engage the convolute flange extending from said spur gear.

3. A gearing comprising a spur gear, a toothed flange the periphery of which extends in a convolute from said spur gear and is inclined with respect thereto, a segmental gear adapted to mesh with said spur gear, and a toothed element the periphery of which extends in a convolute from said segmental gear and inclined with respect thereto, said toothed element adapted to mesh with the toothed flange extending from said spur gear.

4. A gearing comprising a spur gear, a flange the periphery of which extends in an outwardly direction in a convolute and at its inner end merges into said spur gear, a segmental gear adapted to engage said spur gear, and a gear element the periphery of which extends in an inwardly direction and in a convolute from said segmental gear and adapted to engage the flange extending from said spur gear.

5. A gearing comprising a spur gear, a toothed flange the periphery of which extends in an outwardly direction and in a convolute from said spur gear and is inclined with respect thereto, a segmental gear adapted to mesh with said spur gear, and a toothed element, the periphery of which extends in an inwardly direction and in a convolute from said segmental gear and inclined with respect thereto, said toothed element adapted to mesh with the toothed flange extending from said spur gear.

6. A gearing comprising two gear elements, each arranged obliquely and engaged with each other, a portion of the edge of each element being developed on a convolute.

7. A gearing comprising two interengaging scroll gears disposed in planes oblique to their axes of rotation.

8. A gearing comprising two gears disposed in planes oblique to their axes of rotation, one of said gears terminating in a spur pinion at its hub that is engageable with a portion of the other gear.

9. A gearing comprising a scroll gear terminating at its outer portion in a concentric gear segment, and a second scroll gear adapted to mesh with the first scroll gear and terminating at its inner end in a concentric gear segment adapted to mesh with the first-mentioned concentric gear segment said scroll gears being arranged oblique to the axes of rotation.

10. A gearing comprising a scroll gear terminating at its outer portion in a concentric gear segment, and a second scroll gear adapted to mesh with the first scroll gear and terminating at its inner end in a concentric gear segment adapted to mesh with the first-mentioned concentric gear segment, the scroll portions of said gears being disposed oblique to the axes of the respective concentric gear segments.

11. A gearing comprising two gear elements each having concentric and eccentric portions, the eccentric portions being arranged to interengage in constantly changing planes during rotational engagement.

12. A gearing comprising two gear elements each having concentric and eccentric portions adapted to continuously interengage in sequence throughout rotation and in constantly changing planes of engagement.

13. In gearing, a gear having concentric and eccentric portions, and a second gear the axis of which is spaced a fixed distance from the axis of the first gear, said second gear shaped so as to continuously engage with said first gear and adapted to drive the same at a gradually changing speed and then at a fixed ratio, said eccentric portion being arranged oblique to its axis of rotation.

14. A gearing comprising two gear elements each having concentric and eccentric portions adapted to continuously interengage in sequence throughout rotation and portions of which pass in superposed relation during rotation.

Signed at Chicago, county of Cook and State of Illinois, this 5th day of March 1924.

FRED MATHEWS.